US009710804B2

(12) United States Patent
Zhou et al.

(10) Patent No.: US 9,710,804 B2
(45) Date of Patent: Jul. 18, 2017

(54) VIRTUAL PAYMENT CARDS ISSUED BY BANKS FOR MOBILE AND WEARABLE DEVICES

(71) Applicants: Andrew H B Zhou, Tiburon, CA (US); Dylan T X Zhou, Belvedere Tiburon, CA (US); Tiger T G Zhou, Tiburon, CA (US); Zhou Tian Xing, Tiburon, CA (US)

(72) Inventors: Andrew H B Zhou, Tiburon, CA (US); Dylan T X Zhou, Belvedere Tiburon, CA (US); Tiger T G Zhou, Tiburon, CA (US); Zhou Tian Xing, Tiburon, CA (US)

( * ) Notice: Subject to any disclaimer, the term of this patent is extended or adjusted under 35 U.S.C. 154(b) by 0 days.

(21) Appl. No.: 15/345,003

(22) Filed: Nov. 7, 2016

(65) Prior Publication Data
US 2017/0076277 A1    Mar. 16, 2017

Related U.S. Application Data

(63) Continuation-in-part of application No. 14/555,628, filed on Nov. 27, 2014, now Pat. No. 8,985,442, and
(Continued)

(51) Int. Cl.
*G06Q 20/34* (2012.01)
*G06Q 20/40* (2012.01)
(Continued)

(52) U.S. Cl.
CPC ...... *G06Q 20/351* (2013.01); *G06K 19/06028* (2013.01); *G06K 19/06037* (2013.01);
(Continued)

(58) Field of Classification Search
CPC .... G06Q 20/351; G06Q 20/401; G06Q 20/22; G06Q 20/32; G06Q 20/3221;
(Continued)

(56) References Cited

U.S. PATENT DOCUMENTS 9,292,849 B2 *   3/2016   Kurian ............... G06Q 20/385
9,489,671 B2 *  11/2016   Zhou .................. G06Q 20/3274
(Continued)

*Primary Examiner* — Daniel Walsh
(74) *Attorney, Agent, or Firm* — Georgiy L. Khayet

(57) ABSTRACT

Provided is a method for issuing single-use and multiple-use virtual payment cards via a mobile and wearable device. The method may include receiving a card issuance request from a user, prompting the user to enter a user authentication information, accessing a user account maintained by a card issuer, generating the virtual payment card based on payment data of the user account, and providing the virtual payment card to the mobile and wearable device. The method may continue with receiving a transaction request from a merchant and matching merchant identification data provided by the user in the card issuance request and merchant identification data provide by the merchant. If the match of the merchant identification data is determined, the method may continue with authorizing a payment transaction by transferring a payment amount from the virtual payment card to a merchant account associated with the merchant.

17 Claims, 5 Drawing Sheets

Related U.S. Application Data a continuation-in-part of application No. 14/957,644, filed on Dec. 3, 2015, now Pat. No. 9,489,671, which is a continuation-in-part of application No. 14/815,988, filed on Aug. 1, 2015, now Pat. No. 9,342,829, application No. 15/345,003, which is a continuation-in-part of application No. 14/979,613, filed on Dec. 28, 2015, now Pat. No. 9,361,616, and a continuation-in-part of application No. 15/343,227, filed on Nov. 4, 2016, and a continuation-in-part of application No. 13/646,706, filed on Oct. 7, 2012.

(51) Int. Cl.
  *G06K 19/06*    (2006.01)
  *G06Q 20/32*    (2012.01)
  *G06Q 20/22*    (2012.01)

(52) U.S. Cl.
  CPC .............. *G06Q 20/22* (2013.01); *G06Q 20/32* (2013.01); *G06Q 20/401* (2013.01)

(58) Field of Classification Search
  CPC ............... G06Q 20/206; G06Q 20/102; G06K 19/06037; G06K 19/06028
  See application file for complete search history.

(56) References Cited

U.S. PATENT DOCUMENTS

| | | | | |
|---|---|---|---|---|
| 2001/0005832 A1* | 6/2001 | Cofta | ................... | G06Q 20/00 705/17 |
| 2001/0013551 A1* | 8/2001 | Ramachandran | .... | G06K 7/0004 235/472.02 |
| 2001/0032878 A1* | 10/2001 | Tsiounis | ................ | G06Q 20/02 235/379 |
| 2001/0034717 A1* | 10/2001 | Whitworth | ........... | G06Q 20/341 705/64 |
| 2001/0047335 A1* | 11/2001 | Arndt | ..................... | G06Q 20/04 705/44 |
| 2001/0051915 A1* | 12/2001 | Ueno | ..................... | G06Q 20/04 705/39 |
| 2002/0007320 A1* | 1/2002 | Hogan | ................... | G06Q 20/00 705/26.1 |
| 2002/0026575 A1* | 2/2002 | Wheeler | ................ | G06Q 20/00 713/156 |
| 2002/0035548 A1* | 3/2002 | Hogan | ................... | G06Q 20/02 705/64 |
| 2002/0046185 A1* | 4/2002 | Villart | .................... | G06Q 20/04 705/64 |
| 2002/0060242 A1* | 5/2002 | Hayashida | ............. | G06Q 20/04 235/379 |
| 2002/0066042 A1* | 5/2002 | Matsumoto | ............ | G06Q 20/02 726/7 |
| 2002/0153414 A1* | 10/2002 | Stoutenburg | ........... | G06Q 20/04 235/380 |
| 2003/0055792 A1* | 3/2003 | Kinoshita | .............. | G06Q 20/04 705/67 |
| 2003/0101137 A1* | 5/2003 | Wronski, Jr. | .......... | G06Q 20/00 705/44 |
| 2005/0042983 A1* | 2/2005 | Borgward | ............... | G06F 21/10 455/3.06 |
| 2005/0192896 A1* | 9/2005 | Hutchison | .............. | G06Q 20/10 705/40 |
| 2006/0000900 A1* | 1/2006 | Fernandes | .............. | G06Q 20/04 235/380 |
| 2006/0213972 A1* | 9/2006 | Kelley | ................. | G06K 7/0008 235/380 |
| 2008/0010193 A1* | 1/2008 | Rackley, III | ......... | G06Q 20/042 705/39 |
| 2009/0006254 A1* | 1/2009 | Mumm | .................. | G06Q 20/02 705/44 |
| 2010/0057553 A1* | 3/2010 | Ameiss | ................ | G06Q 20/387 705/14.32 |
| 2010/0082487 A1* | 4/2010 | Nelsen | .................... | G06Q 20/10 705/44 |
| 2011/0137748 A1* | 6/2011 | Baher | .................... | G06Q 20/12 705/26.41 |
| 2011/0302089 A1* | 12/2011 | McKenzie | ......... | G06Q 20/3274 705/75 |
| 2012/0005076 A1* | 1/2012 | Dessert | .................. | G06Q 20/10 705/39 |
| 2012/0006891 A1* | 1/2012 | Zhou | .................. | G06Q 20/3274 235/380 |
| 2012/0310826 A1* | 12/2012 | Chatterjee | .............. | G06Q 20/36 705/41 |
| 2014/0052607 A1* | 2/2014 | Park | .................... | G06Q 40/025 705/38 |
| 2014/0129422 A1* | 5/2014 | Zhou | .................. | G06Q 40/025 705/38 |
| 2014/0143037 A1* | 5/2014 | Zhou | .................. | G06Q 30/0226 705/14.17 |
| 2014/0195324 A1* | 7/2014 | Hage | ................. | G06Q 30/0228 705/14.29 |
| 2014/0249941 A1* | 9/2014 | Hicks | ................ | G06K 7/10821 705/17 |
| 2014/0279474 A1* | 9/2014 | Evans | ................ | G06Q 20/3572 705/41 |
| 2015/0058145 A1* | 2/2015 | Luciani | .............. | G06Q 20/3274 705/17 |
| 2016/0027005 A1* | 1/2016 | Kurian | ................ | G06Q 20/385 235/379 |
| 2016/0086161 A1* | 3/2016 | Zhou | .................. | G06Q 20/3274 705/44 |
| 2016/0162857 A1* | 6/2016 | Kurian | ................ | G06Q 20/385 235/379 |
| 2016/0162887 A1* | 6/2016 | Kurian | ................ | G06Q 20/385 705/41 |

\* cited by examiner

US 9,710,804 B2

VIRTUAL PAYMENT CARDS ISSUED BY BANKS FOR MOBILE AND WEARABLE DEVICES

CROSS-REFERENCES TO RELATED APPLICATIONS

This application is a continuation-in-part of U.S. patent application Ser. No. 15/343,227, entitled "SYSTEMS AND METHODS FOR MOBILE APPLICATION, WEARABLE APPLICATION, TRANSACTIONAL MESSAGING, CALLING, DIGITAL MULTIMEDIA CAPTURE AND PAYMENT TRANSACTIONS", filed on Nov. 4, 2016; U.S. patent application Ser. No. 14/555,628, entitled "ONE-TOUCH PAYMENT USING HAPTIC CONTROL VIA A MESSAGING AND CALLING MULTIMEDIA SYSTEM ON MOBILE DEVICE AND WEARABLE DEVICE, CURRENCY TOKEN INTERFACE, POINT OF SALE DEVICE, AND ELECTRONIC PAYMENT CARD", filed on Nov. 27, 2014; U.S. patent application Ser. No. 13/646,706, entitled "METHODS AND SYSTEMS FOR PREVENTING CARD PAYMENT FRAUD AND RECEIVING PAYMENTS USING CODES AND MOBILE DEVICES", filed on Oct. 7, 2012; U.S. patent application Ser. No. 14/957,644, entitled "SYSTEMS AND METHODS FOR MOBILE APPLICATION, WEARABLE APPLICATION, TRANSACTIONAL MESSAGING, CALLING, DIGITAL MULTIMEDIA CAPTURE AND PAYMENT TRANSACTIONS", filed on Dec. 3, 2015, which is a continuation-in-part of U.S. patent application Ser. No. 14/815,988, entitled "SYSTEMS AND METHODS FOR MOBILE APPLICATION, WEARABLE APPLICATION, TRANSACTIONAL MESSAGING, CALLING, DIGITAL MULTIMEDIA CAPTURE AND PAYMENT TRANSACTIONS", filed on Aug. 1, 2015, which claims priority to U.S. patent application Ser. No. 13/760,214, entitled "WEARABLE PERSONAL DIGITAL DEVICE FOR FACILITATING MOBILE DEVICE PAYMENTS AND PERSONAL USE", filed on Feb. 6, 2013, which is a continuation-in-part of U.S. patent application Ser. No. 12/749,412, entitled "EFFICIENT TRANSACTIONAL MESSAGING BETWEEN LOOSELY COUPLED CLIENT AND SERVER OVER MULTIPLE INTERMITTENT NETWORKS WITH POLICY BASED ROUTING", filed on Mar. 29, 2010 and U.S. patent application Ser. No. 10/677,098, entitled "EFFICIENT TRANSACTIONAL MESSAGING BETWEEN LOOSELY COUPLED CLIENT AND SERVER OVER MULTIPLE INTERMITTENT NETWORKS WITH POLICY BASED ROUTING", filed on Sep. 30, 2003, which claims priority to Provisional Application No. 60/415,546, entitled "DATA PROCESSING SYSTEM", filed on Oct. 1, 2002; and U.S. patent application Ser. No. 14/979,613, entitled "ONE-SCAN AND ONE-TOUCH PAYMENT AND BUYING USING HAPTIC CONTROL VIA MESSAGING AND CALLING MULTIMEDIA SYSTEM ON MOBILE AND WEARABLE DEVICE, CURRENCY TOKEN INTERFACE, POINT OF SALE DEVICE, AND ELECTRONIC PAYMENT CARD", filed on Dec. 28, 2015, which are incorporated herein by reference in their entirety.

FIELD

This application relates generally to data processing, and more specifically, to systems and methods for issuing virtual payment cards for mobile and wearable devices.

BACKGROUND

In applying for a payment card, a customer usually has to physically visit a bank, spent some time there filling out a plurality of bank forms and standing in queues. Subsequently, the bank processes a credit card application by evaluating the creditworthiness of an applicant, verifying his credit history and employment information. In addition, the processing of payment cards, for example, carving names and card numbers on a credit card and storing magnetic information on a magnetic stripe of the card, takes a certain amount of time.

Thus, obtaining a payment card after filing an application may be a long-lasting procedure. However, customers may desire to receive a payment card immediately. Additionally, the customers may want to avoid issuance of physical plastic payment cards and may want to have only virtual payment cards to avoid frauds related to personal payment data.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The present disclosure is related to a system and a method for issuing single-use and multiple-use virtual payment cards via a mobile and wearable device. According to one embodiment of the disclosure, a system for issuing single-use and multiple-use virtual payment cards via a mobile and wearable device may include a processor, a card issuance unit, and a storage unit. The processor may be operable to receive a card issuance request for issuing a virtual payment card. The card issuing request may be received from the mobile and wearable device of a user. The request may include a payment amount and a first merchant identification data associated with a merchant. The processor may be further operable to prompt the user to enter a user authentication information in response to the request. The processor may be operable to receive the user authentication information from the user. The processor may be further operable to access a user account maintained by a card issuer. The accessing of the user account may be based on the user authentication information. The user account may include at least a payment data associated with the user. The card issuance unit may be operable to generate the virtual payment card based on the payment data associated with the user and the first merchant identification data. The virtual payment card may have a deposit. The deposit may be equal to the payment amount requested by the user in the card issuance request. The card issuance unit may be further operable to provide the virtual payment card to the mobile and wearable device. The processor may be further operable to receive, from the merchant, a transaction request to perform a payment transaction associated with the user. The transaction request may include at least a second merchant identification data and data associated with the virtual payment card. The processor may be further operable to match the first merchant identification data and the second merchant identification data. The processor may be operable to authorize the payment transaction upon determining a match of the first merchant identification data and the second merchant identification data. The authorizing may be performed by transferring the payment amount from the virtual payment card to a merchant account associated with the merchant. The authorizing of the payment transaction may be performed upon determining that the first merchant identification data and the second merchant identification data match. The merchant account may be retrieved from the second merchant identification data. The processor may be further operable to determine, based on the transferring, that the payment transaction associated with the user is completed. The processor may be operable to deactivate the virtual payment card based on the determining that the payment transaction is completed. The storage unit may be operable to store at least the user authentication information, the virtual payment card, the first merchant identification data, and the second merchant identification data.

In another embodiment of the disclosure, a method for issuing single-use and multiple-use virtual payment cards via a mobile and wearable device is provided. The method may commence with receiving, by a processor, a card issuance request for issuing a virtual payment card. The request may be received from the mobile and wearable device of a user. The request may include a payment amount and a first merchant identification data associated with a merchant. In response to the request, the method may include prompting, by the processor, the user to enter a user authentication information. The method may continue with receiving, by the processor, the user authentication information. The user authentication information may be received from the user. The method may further continue with accessing, by the processor, a user account maintained by a card issuer. The accessing of the user account may be based on the user authentication information. The user account may include at least a payment data associated with the user. The method may continue with generating, by a card issuance unit, the virtual payment card. The generation of the virtual payment card may be based on the payment data associated with the user and the first merchant identification data. The virtual payment card may have a deposit. Generating of the virtual payment card may be based on the payment data associated with the user and the first merchant identification data. The deposit may be equal to the payment amount requested by the user in the card issuance request. The method may further continue with providing, by the card issuance unit, the virtual payment card to the mobile and wearable device. The method may further include receiving, by the processor, a transaction request to perform a payment transaction associated with the user. The transaction request may be received from the merchant. The transaction request may include at least a second merchant identification data and data associated with virtual payment card. The method may continue with matching, by the processor, the first merchant identification data and the second merchant identification data. The method may further continue with authorizing, by the processor, the payment transaction by transferring the payment amount from the virtual payment card to a merchant account associated with the merchant. The payment transaction may be authorized upon determining a match of the first merchant identification data and the second merchant identification data. The merchant account may be retrieved from the second merchant identification data. The method may continue with determining, by the processor, that the payment transaction associated with the user is completed. The determination that the payment transaction associated with the user is completed may be based on transferring of the payment amount from the use virtual payment card to a merchant account associated with the merchant. The method may further continue with deactivating, by the processor, the virtual payment card. The deactivation of the virtual payment card may be based on the determining that the payment transaction is completed.

In further exemplary embodiments, modules, subsystems, or devices can be adapted to perform the recited steps. Other features and exemplary embodiments are described below.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
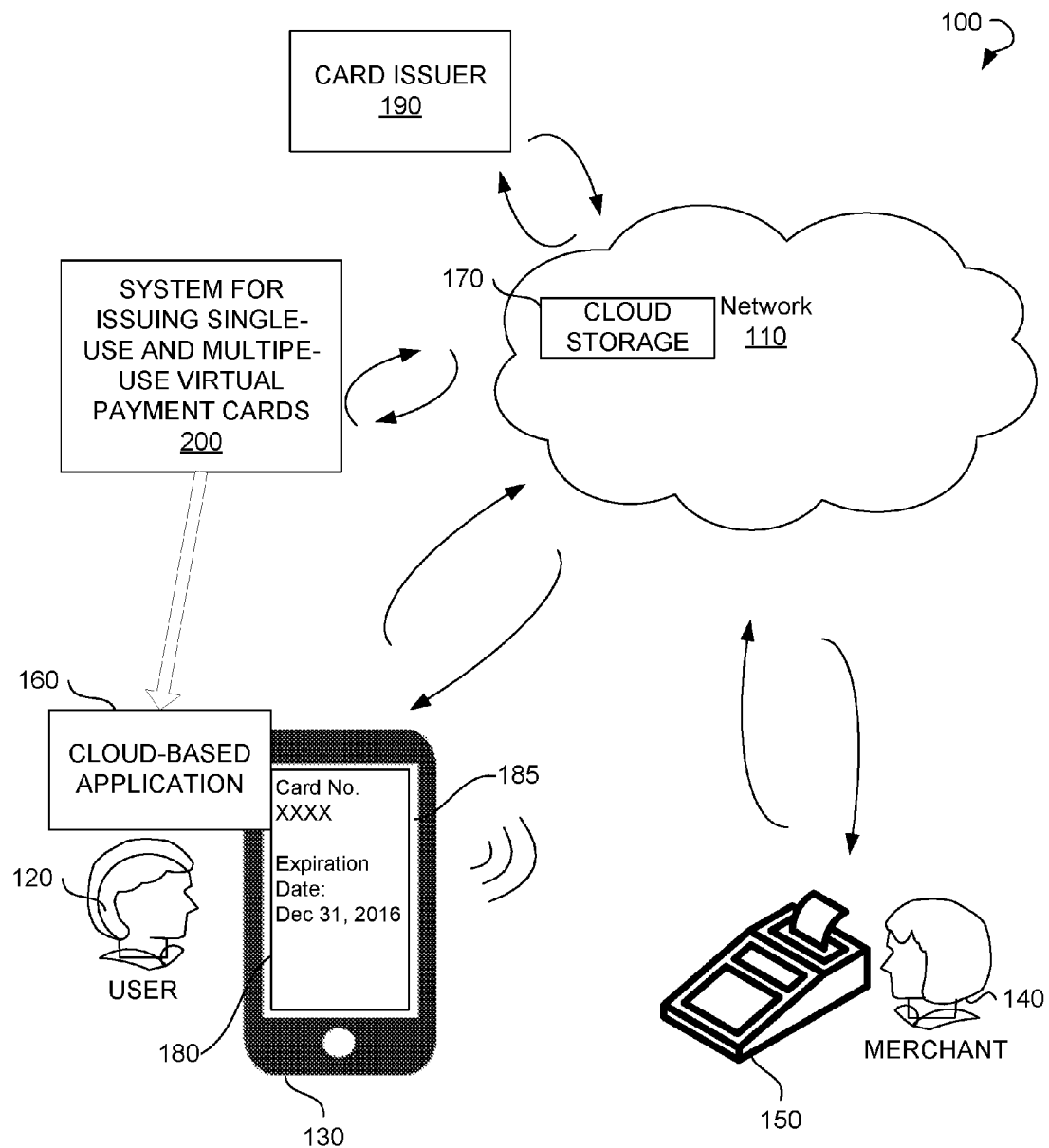
FIG. 1 is a block diagram showing an environment within which methods and systems for issuing single-use and multiple-use virtual payment cards via a mobile and wearable device can be implemented, in accordance with an example embodiment.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

Various computer implemented methods and systems for issuing single-use and multiple-use virtual payment cards via a mobile and wearable device are described herein. The described system provides issuance of digital virtual payment cards, also referred to herein as single-use and multiple-use virtual payment cards or virtual payment cards, by third-party organizations, such as banks. The virtual payment cards may be issued for a user based on financial data of the user stored or collected by a third-party organization. Therefore, though the user may have an account opened in the third-party organization, there may be no need to issue physical plastic payment cards, such as Visa, Master Card, American Express, and so forth.

The virtual payment card may be an electronically issued payment card having a unique card number. The unique card number may be generated for a specific transaction only. The unique card number may be electronically generated via a web service or a mobile application running on a mobile and wearable device of the user and being in communication with a card issuer. The card issuer may include a bank or any other third-party organization. The virtual card may be issued for the exact amount of the transaction. Thus, the possibility of fraud related to the account of the user opened in the bank may be significantly reduced. Furthermore, though inherent risks involved with credit card usage exist, a virtual payment card may eliminate the risk of compromising the virtual payment card. More specifically, the virtual payment card may be generated for a specific transaction or for several transaction within a predetermined time and, after the transaction is completed, the virtual payment card may become invalid. Therefore, even though data associated with the virtual payment card may be stolen, the data of the account of the user in the bank cannot be accessed using the stolen data because the virtual payment card may be deactivated.

Additionally, the user may control spending parameters associated with the virtual payment card. More specifically, the user may set restrictions related to the virtual payment card. The restrictions may include a specific money amount allowed to be spent, a range of the money amount allowed to be spent, the number of times the virtual payment card can be used, such as for a one-time payment or for a payment within a predetermined time limit, persons allowed to use the virtual payment card, such as a primary holder of the account and a secondary holder of the account, places where the virtual payment card may be used, such as a specific merchant. By using the restrictions, a risk of an unauthorized use of the virtual payment card may be reduced.

The virtual payment card may be also useful for companies and businesses. More specifically, paying bills by a company using a virtual payment card may result in cost savings, such as money costs related to issuance of physical cards and time and resource saving related to actions taken by a staff of the company. Additionally, a rebate may be provided to the user or the company based on the amount of money spent using the virtual payment card.

Moreover, the user may monitor amount of money spent using the virtual payment card. Since one virtual payment card is generated for each specific transaction, the generated virtual payment cards may be electronically tracked and reconciled by the card issuer and a report related to the use of virtual payment cards may be provided to the user. Furthermore, analysis of the use of the virtual payment cards by the user may be performed. The analysis may include evaluation of spending of money by the user for a specific time period, list of merchants that accepted the payment using the virtual payment cards, an average amount spent at each of the merchants, and the like. In fact, the user may use the virtual payment cards for performing payments related to electronic accounts associated with a plurality of merchants, corporate travel payments, mobile payments, and so forth.

Referring now to the drawings, FIG. 1 illustrates an environment 100 within which a system and a method for issuing single-use and multiple-use virtual payment cards via a mobile and wearable device can be implemented. The environment 100 may include a network 110, a user 120, a mobile and wearable device 130, a merchant 140, a merchant device 150, and a system 200 for issuing single-use and multiple-use virtual payment cards via a mobile and wearable device, also referred to as the system 200. The system 200 may have a distributed architecture including a cloud-based application 160 running on the mobile and wearable device 130, and a cloud storage 170 associated with the mobile and wearable device 130 of the user 120. The mobile and wearable device 130 may include a smartphone, a wearable device (e.g., augmented reality glasses, a smart watch), a tablet computer, a lap top, and so forth.

The merchant device 150 may include a payment terminal, such as a point of sale terminal, a credit card terminal, a card reader, and any other device that interfaces with payment cards to make electronic funds transfers. The merchant device 150 may be located at a point of sale associated with the merchant 140.

The user 120 may activate the cloud-based application 160 on the mobile and wearable device 130. Upon activation of the cloud-based application 160, a request to issue a virtual payment card 180 may be sent to the system 200. In response to the request, the system 200 may generate the virtual payment card 180 and provide the virtual payment card 180 to the mobile and wearable device 130. Upon receipt of the virtual payment card 180 by the mobile and wearable device 130, the virtual payment card 180 may be displayed on an interface 185 of the mobile and wearable device 130.

The user 120 may put the mobile and wearable device 130 in a proximity to the merchant device 150 to enable connection between the mobile and wearable device 130 and the merchant device 150. The connection the mobile and wearable device 130 and the merchant device 150 may be established through radio waves, contacts for direct electrical connection, data-strip reading, and so forth. The mobile and wearable device 130 and the merchant device 150 may include one or more of a radio frequency identification chip, a Near Field Communication (NFC) chip, one or more contacts for direct electrical connection, a magnetic data strip, a holographic data strip, and so forth.

Upon establishment of the connection between the mobile and wearable device 130 and the merchant device 150, a payment request may be sent by the merchant device 150 to a card issuer 190 via the network 110.

The cloud-based application 160 may be provided on a display of the mobile and wearable device 130, or may be projected or otherwise displayed by the mobile and wearable device 130 via a web browser or through another way. The cloud-based application 160 may provide to the user 120 the interface 185. The cloud-based application 160 may include a file hosting service, which may offer cloud storage, file synchronization, personal cloud, and client software.

When the payment operation is performed, payment details of the user 120 may be accessed in the cloud storage 170. The payment details may include data of a credit card, debit card, payment card, banking account, virtual currency account, web purse, or another payment facility of the user. The payment performed using the virtual payment card 180 may include an Internet payment, a scan code payment, a person-to-person payment, a buyer-to-merchant payment, a peer-to-peer payment, an in-application payment, a point-of-sale payment, a mobile payment, a wearable payment, a one-touch buying, and a digital wallet payment, and so forth. The payment details are not stored in the mobile and wearable device 130. The payment details may be stored in the cloud storage 170, which may be associated with the card issuer 190, and provided via the cloud-based application 160 in a form of the virtual payment card 180 only to perform the transaction. Thus, the payment details of the user 120 may be protected from a theft or fraud.

Communication between the mobile and wearable device 130, the system 200, and the card issuer 190 may be performed via a network 110. The network 110 may include the Internet or any other network capable of communicating data between devices. Suitable networks may include or interface with any one or more of, for instance, a local intranet, a Personal Area Network, a Local Area Network, a Wide Area Network, a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or an Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a Small Computer Systems Interface connection, a Universal Serial Bus connection or other wired or wireless, digital or analog interface or connection, mesh or Digi® networking. The network 110 may be a network of data processing nodes that are interconnected for the purpose of data communication.

The systems and methods describe herein may also be practiced in a wide variety of network environments (represented by the network 110) including, for example, Transmission Control Protocol/Internet Protocol (TCP/IP)-based networks, telecommunications networks, wireless networks, etc. In addition, the computer program instructions may be stored in any type of computer-readable media. The program may be executed according to a variety of computing models including a client/server model, a peer-to-peer model, on a stand-alone computing device, or according to a distributed computing model in which various functionalities described herein may be effected or employed at different locations.

Figure 2:
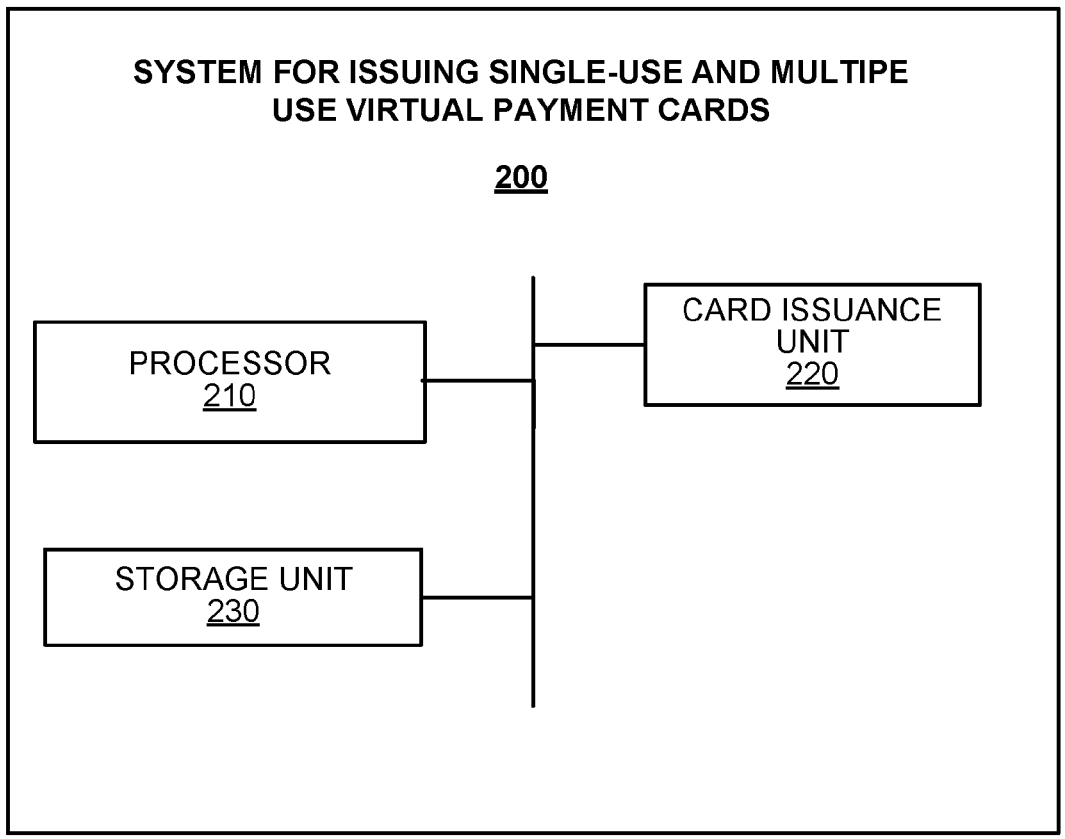
FIG. 2 is a block diagram showing a system for issuing single-use and multiple-use virtual payment cards via a mobile and wearable device, in accordance with an example embodiment.

FIG. 2 is a block diagram showing various modules of a system 200 for issuing single-use and multiple-use virtual payment cards via a mobile and wearable device, in accordance with certain embodiments. Specifically, the system 200 may include a processor 210, a card issuance unit 220, and a storage unit 230. Operations performed by each of the processor 210, the card issuance unit 220, and the storage unit 230 are described below with reference to FIG. 3. The storage unit 230 of the system 200 may be operable to store at least the user authentication information, the virtual payment card, the first merchant identification data, the second merchant identification data, and any other information related to a user, a merchant, or a payment transaction.

Figure 3:
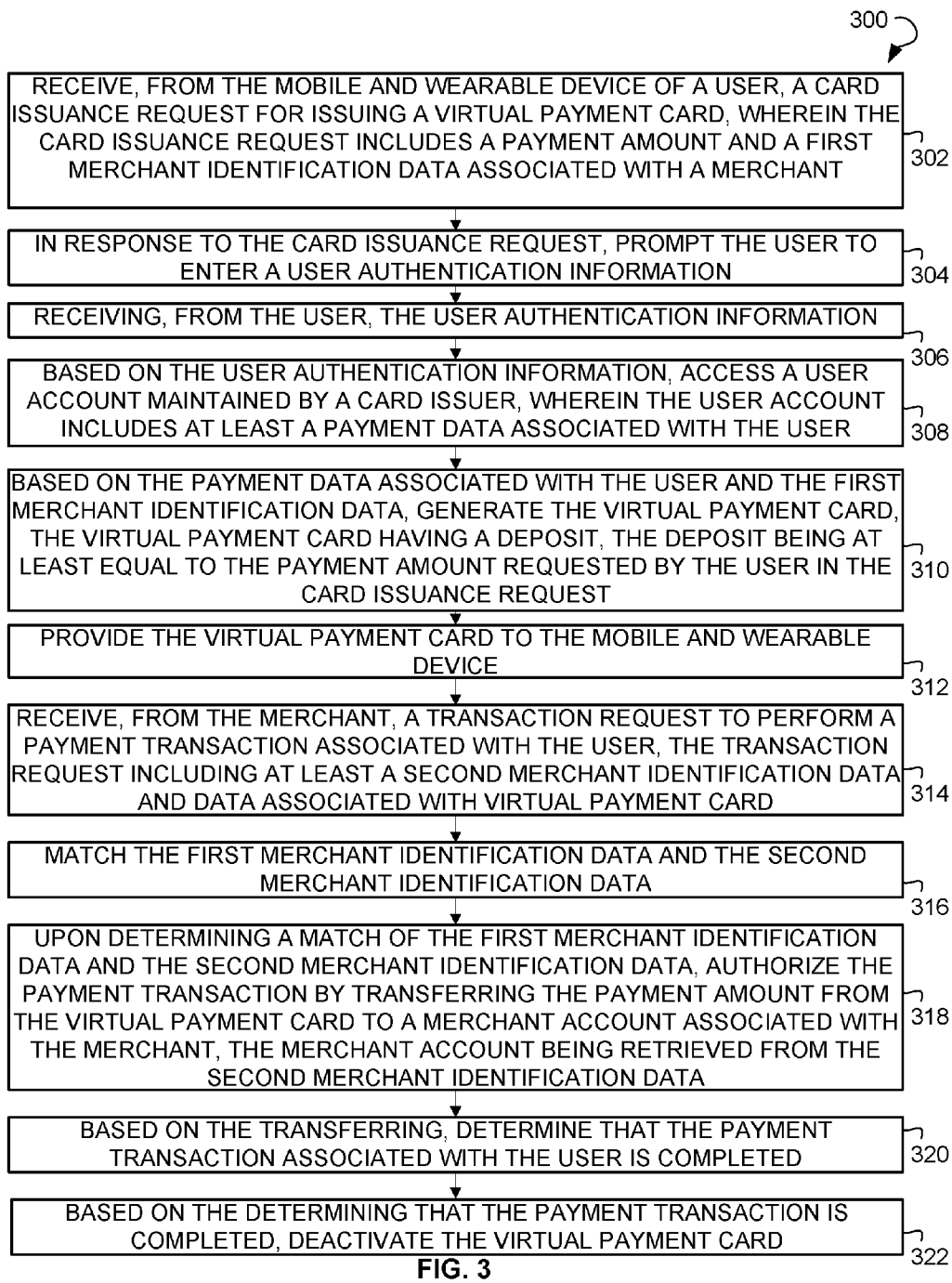
FIG. 3 is a flow chart illustrating a method for issuing single-use and multiple-use virtual payment cards via a mobile and wearable device, in accordance with an example embodiment.

FIG. 3 is a flow chart illustrating a method 300 for issuing single-use and multiple-use virtual payment cards via a mobile and wearable device, in accordance with certain embodiments. The method 300 may commence with receiving, by a processor, from the mobile and wearable device of a user, a card issuance request at operation 302. The card issuance request may include a request for issuing a virtual payment card. The card issuance request may include a payment amount to be deposited to the virtual payment card and a first merchant identification data associated with a merchant.

The method 300 may continue with prompting, by the processor, the user to enter a user authentication information at operation 304. The method 300 may further include an operation 306, at which the user authentication information may be received from the user by the processor. In an example embodiment, the user authentication information includes one or more of the following: a name of the user, an address of the user, a guarantor name, a social security number of the user, a phone number of the user, an identification number of the user, a bank account of the user, an insurance account number of the user, a photograph of the user, and so forth.

In an example embodiment, the prompting may include at least displaying an authentication button on the display of the mobile and wearable device. Furthermore, the method 300 may include authenticating an identity of the user. The authentication may include at least a biometric authentication. The biometric authentication may include one or more of a fingerprint authentication, an iris pattern authentication, a heartbeat authentication, and a vein pattern identification. The vein pattern identification may be performed using scanning of one or more of the following: a palm vein pattern, a wrist vein pattern, a hand vein pattern, a leg vein pattern, a foot vein pattern, a neck vein pattern, and a head vein pattern. The fingerprint authentication may include scanning fingerprints of at least one finger of the user when the user touches one or more or the following: the display of the mobile and wearable device, a button of the mobile and wearable device, a rear panel of the mobile and wearable device, and the like. The fingerprint authentication may further include matching the fingerprints to one or more approved fingerprints. The one or more approved fingerprints may be stored in the cloud storage.

The method 300 may further include, accessing, by the processor, a user account maintained by a card issuer at operation 308. The accessing may be performed based on the user authentication information provided by the user. The user account may include at least a payment data associated with the user. The user account maintained by the card issuer may include a payment account associated with a credit card or a debit card of the user. In an example embodiment, the payment data may include data associated with one or more of the following: a credit card, a debit card, a retail card, a charge card, a bank saving account, a bank checking account, an insurance account, a stored-value card, a digital mobile currency, and so forth. The card issuer may be selected from one or more of the following: a bank, a credit card company, an insurance company, a credit union, a store, a third-party organization, and so forth.

The method 300 may continue with generating the virtual payment card at operation 310. The virtual payment card may be generated by a card issuance unit based on the payment data associated with the user and the first merchant identification data. More specifically, the user may obtain the first merchant identification data at a point of sale associated with the merchant, e.g. by scanning a barcode encoding merchant identification data, or may type a name of the merchant based on data provided at point of sale. The generated virtual payment card may have a deposit being equal to or higher than the payment amount requested by the user in the card issuance request.

Upon the generation, the card issuance unit may provide the virtual payment card to the mobile and wearable device at operation 312. Upon receipt of the virtual payment card by the mobile and wearable device, the processor may provide a command to an interface of the mobile and wearable device to display the virtual payment card. The displayed virtual payment card may be read by a card reader associated with the merchant. In an example embodiment, the virtual payment card may be displayed in a form of one or more of the following: a code, the code being selected from a group comprising: a linear dimensional code, a two-dimensional code, a snap tag code, a Quick Response (QR) code, and so forth.

In a further example embodiment, data associated with the virtual payment card may be transmitted from the mobile and wearable device to a merchant device associated with the merchant using an NFC upon bringing the mobile and wearable device and the merchant device into proximity to each other.

More specifically, the method 300 may include receiving an indication that the user brings the mobile and wearable device in proximity to the merchant device associated to initiate sending data related to the virtual payment card to the merchant. The indication may be received based on sensing an interaction of the mobile and wearable device with the merchant device. The interaction may include at least an NFC. The NFC may be used to pair the mobile and wearable device and the merchant device upon bringing the mobile and wearable device into proximity to the merchant device. The mobile and wearable device and the merchant device may be connected to a cloud network. Upon pairing the mobile and wearable device with the merchant device, at least a Bluetooth connection between the mobile and wearable device and the merchant device may be established. The data related to virtual payment card and authentication information associated with the user may be stored in the cloud storage associated with the cloud network.

The method may further include an operation 314, at which the processor may receive, from the merchant, a transaction request to perform a payment transaction associated with the user. The transaction request may include at least a second merchant identification data and data associated with virtual payment card.

At operation 316, the processor may match the first merchant identification data received from the user in the card issuance request and the second merchant identification data received from the merchant in the transaction request. Merchant identification data, such as first merchant identification data and the second merchant identification data, may include one or more of the following: a name of the merchant, an address of the merchant, a name of a store associated with the merchant, a social security number of the merchant, a phone number of the merchant, an identification number of the merchant, a bank account number of the merchant, an insurance account number of the merchant, a product code associated with one or more products provided in a store associated with the merchant, and so forth.

If a match of the first merchant identification data and the second merchant identification data is determined, the processor may authorize the payment transaction at operation 318. More specifically, the authorization of the payment transaction may include transferring the payment amount from the virtual payment card to a merchant account associated with the merchant. The merchant account may be retrieved from the second merchant identification data provided by the merchant in the transaction request. In an example embodiment, the payment transaction may be associated with an internet payment, an NFC payment, a scan code payment, a person-to-person payment, a buyer-to-merchant payment, a peer-to-peer payment, an in-application payment, a point-of-sale payment, a mobile payment, a wearable payment, a digital wallet payment, and so forth.

Based on the transfer of the payment amount, the processor may determine, at operation 320, that the payment transaction associated with the user is completed.

In an example embodiment, upon determining that the payment transaction associated with the user is completed, the processor my check whether a portion of the payment amount is present on the virtual payment card. The portion of the payment amount may be left on the virtual payment card is the payment amount transferred to the merchant is less that the deposit of the virtual payment card. If the portion of the payment amount is present on the single-use virtual payment card, the processor may transfer the portion of the payment amount from the virtual payment card to a payment card associated with the user. The payment card may be determined based on the payment data, such as a credit card or a debit card of the user.

The method 300 may further include an operation 322, at which the processor may deactivate the virtual payment card based on the determining that the payment transaction is completed.

In an example embodiment, the account of the user may include an account associated with banks and retailers, such as an account opened by the user in a bank or in an organization associated with a retailer. The retailers may include one or more of the following organizations: Wal-Mart, Costco, The Kroger Company, Home Depot, Walgreens Boots Alliance Inc, Target, ETC, and so forth. The banks may include one or more of the following: Fargo bank, Citibank bank, Industrial and Commercial Bank of China, China Construction Bank, Agricultural Bank of China, Bank of China, Mitsubishi UFJ, HSBC Holdings, JPMorgan Chase, BNP Paribas, Bank of America, Credit Agricole, and so forth.

In an example embodiment, the method 300 may further include receiving product data. The product data may be provided by the merchant device based on the interaction. The product data may include at least a price of a product the user wants to buy.

In an example embodiment, the method 300 may include encrypting the transaction request associated with the payment transaction to obtain an encrypted payment request. The encrypting of the payment request may include generating a one-time code. The one-time code may encode at least the data of the virtual payment card of the user, the product data, and the merchant identification data.

In an example embodiment, the payment transaction may be authorized when a geographic location determined by the mobile and wearable device matches a geographic location of the merchant at a time of the selecting of requesting, by the merchant, to perform the payment transaction.

In further example embodiments, the method 300 may include securing the mobile and wearable device via a band to a part of a human body. The part of the human body may include one or more of the following: a wrist, an arm, a neck, a bead, a leg, a waist, an ear, and a finger. The mobile and wearable device may be secured under, within or on clothing.

In further example embodiments, the method 300 may include setting, by the card issuance unit, a validity period for the virtual payment card. The validity period may be pre-selected by the user and stored in the user account. In this embodiment, the deactivation of the virtual payment card may be performed upon expiration of the validity period.

In some example embodiments, the cloud-based application may include one or more of the following: a media player, a multimedia library, an online radio broadcaster, an online store selling software applications for the mobile and wearable device, and a mobile and wearable device management application to play, download, purchase, organize multimedia, send multimedia gift cards, and synchronize the multimedia with a portable device and one or more internet-connected devices. The cloud-based application may be configured to prompt the user to purchase and download one or more or the following: music, music videos, television shows, audio books, movies, movie rentals, and the like.

In further example embodiments, the cloud-based application may reside in the cloud network and may be provided on the mobile and wearable device via a web browser, a projector, or a hologram. The cloud-based application may be provided for purchase in one or more applications stores. The one or more applications stores may be associated with an operating system including one of the following: Microsoft Windows, Linux, Android, Blackberry, iOS, Windows Phone, and so forth. In some example embodiments, the cloud-based application may be provided free of charge or at a predetermined price.

In a further example embodiment, the virtual payment card may be associated with a joint operation with banks and top retailers. Additionally, the cloud-based application running on the mobile and wearable device may reside in a cloud network and may be provided on the mobile and wearable device via one or more of the following: a web browser, a projector, and a hologram, an augmented reality (AR) device, and a virtual reality (VR) device. The cloud-based application is provided for purchasing in one or more applications stores, the one or more applications stores being associated with an operating system running on the mobile and wearable device, the operating system including one of the following: Microsoft Windows, Linux, Android, Blackberry, iOS, and Windows Phone. The cloud-based application may be provided free of charge or at a predetermined price. The cloud-based application may include at least a bank account emulation (BAE) client, the BAE client is configured to provide emulation of a bank account to combine with cloud computing and provide an emulated virtual payment card. The bank account may be emulated based on metadata associated with the user, a phone number associated with the user, and data associated with a point-of-sale (POS) terminal of the merchant. The BAE client may be configured to provide a virtual representation of an emulated bank account.

The operating system associated with the mobile and wearable device may be configured to run the BAE client, provide two communication paths for NFC commands from the POS terminal based on an application identifier (AID) associated with the BAE client. The operating system may be further configured to use the AID to route the NFC commands to the cloud-based application managing the emulation of the bank account.

When the user presents the emulated virtual payment card for transaction, an NFC command may be routed to the BAE client for verification of the NFC commands by the cloud-based application managing the emulation of the bank account.

The cloud-based application may be configured to connect to a backend associated with the card issuer to complete the transaction. The cloud-based application may be associated with a trusted tokenization node. The trusted tokenization node may be a shared resource used to generate and de-tokenize tokens representing data associated with the virtual payment card at the backend associated with the issuer. The BAE client may provide multi-level security by providing limited use keys, tokenization, device fingerprinting, and dynamic risk analysis. The limited use keys may be derived from a master domain key shared by the issuer. A use of the limited use keys may be associated with time to live of the limited use keys and a number of transactions to be performed using the limited use keys. The device fingerprints may be profiles associated with the mobile and wearable device and are used to determine that transactions are initiated only by an authorized mobile and wearable device at recognized locations of the POS terminal.

Figure 4:
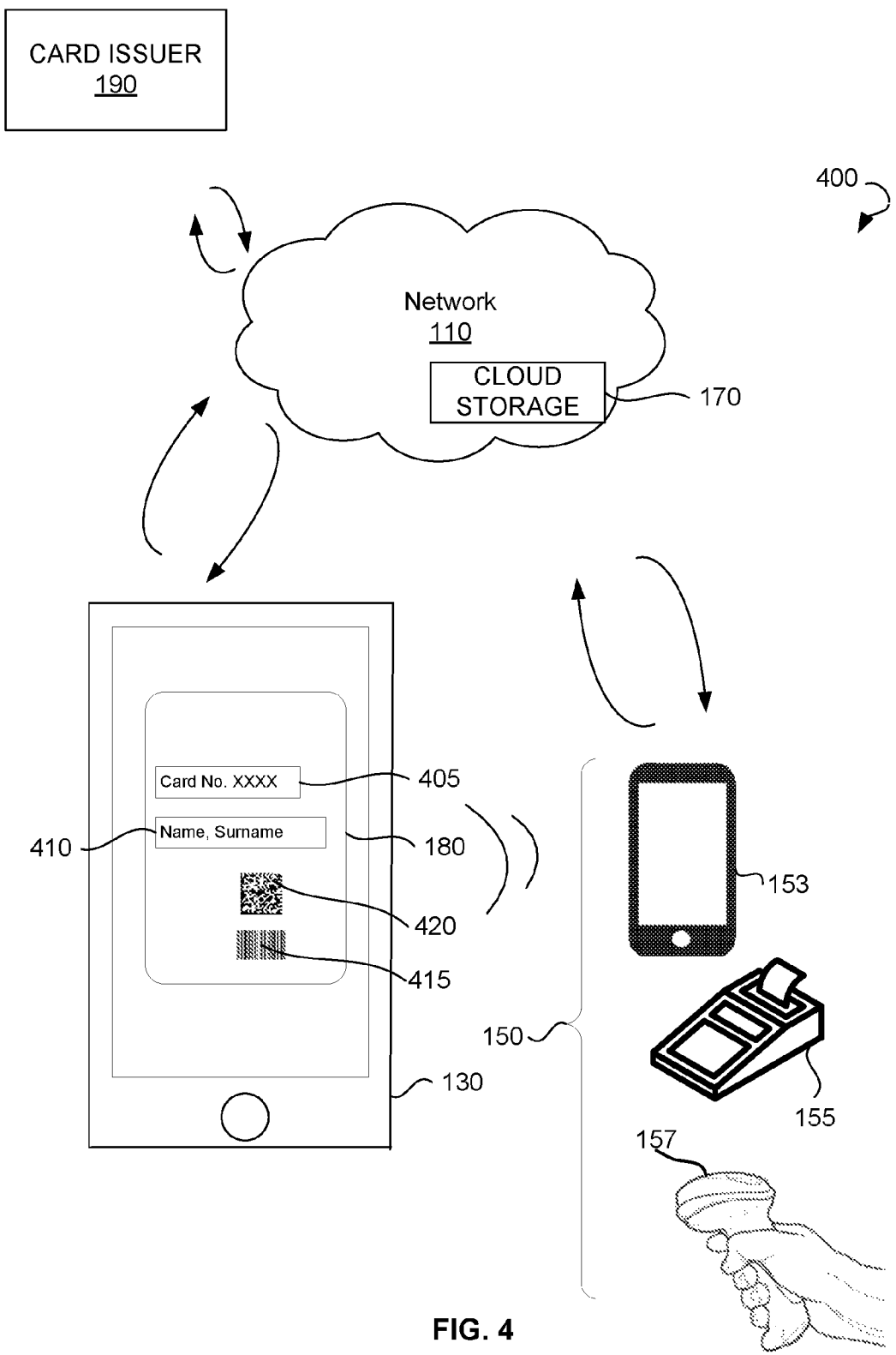
FIG. 4 illustrates a schematic diagram of an interaction of a mobile and wearable device and a merchant device during a payment transaction, in accordance with an example embodiment.

FIG. 4 is a schematic representation 400 of an interaction of a mobile and wearable device and a merchant device during a payment operation, in accordance with an example embodiment. In an example embodiment, a user initiates a generation of a virtual payment card 180, for example, by activating a cloud-based application (not shown) running on the mobile and wearable device 130. Upon activation, the user may send a card issuance request to a card issuer 190. The card issuance request may include merchant identification data and a deposit to be provided to the virtual payment card 180.

Upon receipt of the virtual payment card 180 from the card issuer 190 by the mobile and wearable device 130, the user may bring the mobile and wearable device 130 in proximity to the merchant device 150 so that the mobile and wearable device 130 and the merchant device 150 may communicate with the NFC. When the interaction is determined by the merchant device 150, the merchant device 150 may receive data associated with the virtual payment card 180 from the mobile and wearable device 130. In an example embodiment, the merchant device 150 may include a mobile device 153, a point-of-sale card reader 155, a barcode reader 157, and so forth.

In an example embodiment, upon bringing the mobile and wearable device 130 in proximity to the merchant device 150, the virtual payment card 180 may be displayed on an interface of the mobile and wearable device 130. The displayed virtual payment card 180 may have a card number 405, a name 410 of the user, and a code, such a barcode 415 or a QR code 420.

Upon receipt of the data associated with the virtual payment card 180, the merchant device may sent the data associated with the virtual payment card 180 and the merchant identification information to the card issuer 190 to complete the transaction.

Figure 5:
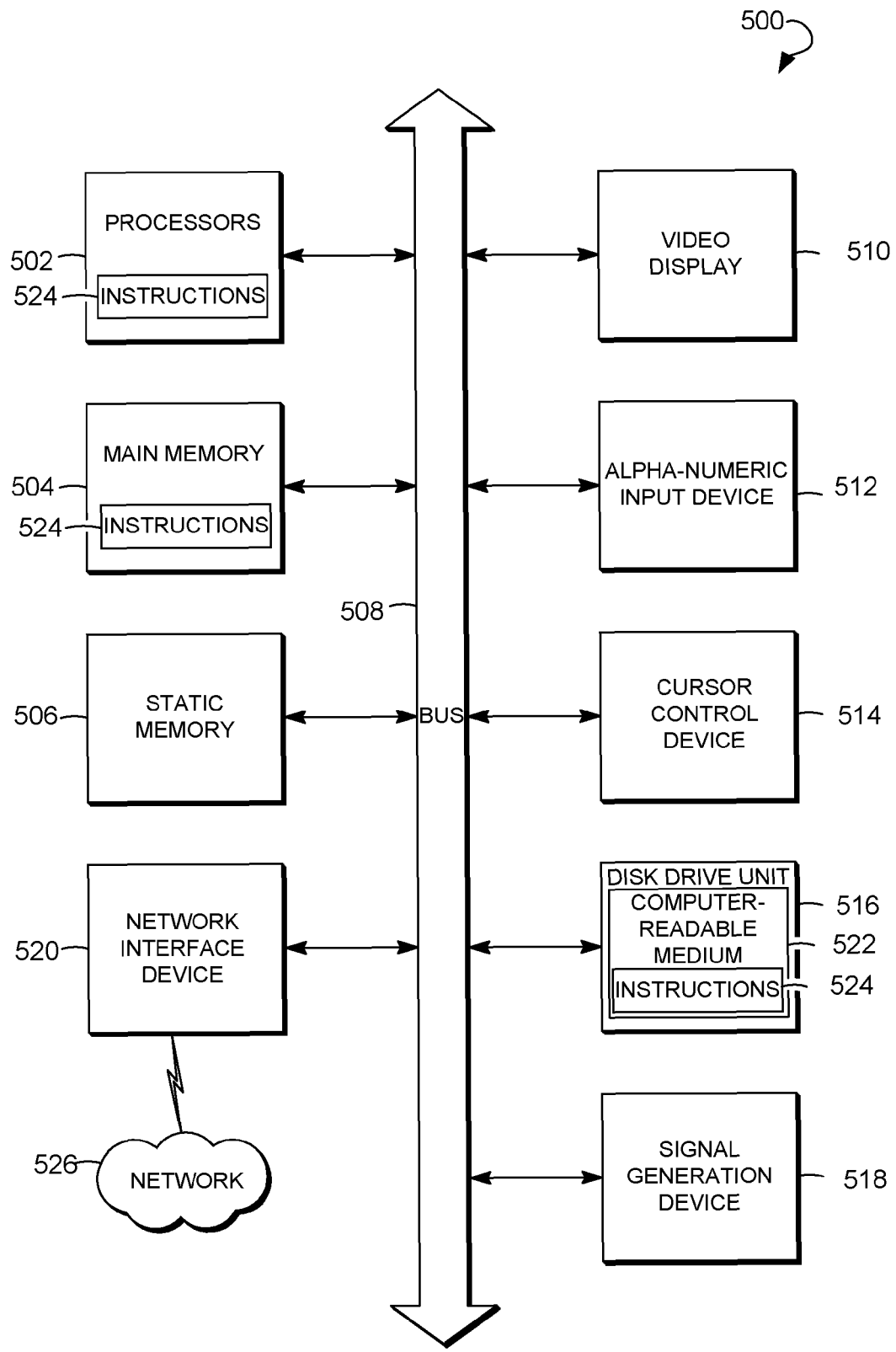
FIG. 5 is a diagrammatic representation of a computing device for a machine in the exemplary electronic form of a computer system, within which a set of instructions for causing the machine to perform any one or more of the methodologies discussed herein can be executed.

FIG. 5 shows a diagrammatic representation of a machine in the example electronic form of a computer system 500, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor or multiple processors 502 (e.g., a central processing unit (CPU), a graphics processing unit (GPU), or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 may also include an alphanumeric input device 512 (e.g., a keyboard), a cursor control device 514 (e.g., a mouse), a disk drive unit 516, a signal generation device 518 (e.g., a speaker) and a network interface device 520.

The disk drive unit 516 includes a non-transitory computer-readable medium 522, on which is stored one or more sets of instructions and data structures (e.g., instructions 524) embodying or utilized by any one or more of the methodologies or functions described herein. The instructions 524 may also reside, completely or at least partially, within the main memory 504 and/or within the processors 502 during execution thereof by the computer system 500. The main memory 504 and the processors 502 may also constitute machine-readable media.

The instructions 524 may further be transmitted or received over a network 526 via the network interface device 520 utilizing any one of a number of well-known transfer protocols (e.g., Hyper Text Transfer Protocol (HTTP)).

While the non-transitory computer-readable medium 522 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAMs), read only memory (ROMs), and the like.

The example embodiments described herein may be implemented in an operating environment comprising software installed on a computer, in hardware, or in a combination of software and hardware.

Thus, various systems and methods for facilitating mobile device payments, multimedia capture, calling, and messaging via a mobile and wearable device have been described. Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

What is claimed is:

1. A system for issuing single use virtual payment cards via a mobile and wearable device, the system comprising:
   a processor configured to:
      receive over a data network, from the mobile and wearable device of a user, a card issuance request for issuing a virtual payment card, wherein the card issuance request includes a payment amount and a first merchant identification data associated with a merchant;
      in response to the card issuance request, prompt the user to enter a user authentication information;
      receive over the data network, from the user, the user authentication information;
      based on the user authentication information, accessing a user account maintained by a card issuer, wherein the user account includes at least a payment data associated with the user;
      receive over the data network, from the merchant, a transaction request to perform a payment transaction associated with the user, the transaction request including at least a second merchant identification data and data associated with the virtual payment card;
      match the first merchant identification data and the second merchant identification data;
      upon determining a match of the first merchant identification data and the second merchant identification data, authorize the payment transaction by transferring the payment amount from the virtual payment card to a merchant account associated with the merchant, the merchant account being retrieved from the second merchant identification data, wherein the processor is operable to transfer the payment amount in response to a merchant device reading an optical code encoding the virtual payment card data displayed on the mobile and wearable device of the user and to transmit virtual payment card data from the mobile and wearable device to a merchant device using a near field communication;
      based on the transferring, determine that the payment transaction associated with the user is completed; and
      based on the determining that the payment transaction is completed, deactivate the virtual payment card;
   a card issuance unit connected over the data network to and remotely located from the processor, merchant, and the mobile and wearable device operable to:
      based on the payment data associated with the user and the first merchant identification data, generate the virtual payment card, the virtual payment card having a deposit amount, the deposit amount being at least equal to the payment amount requested by the user in the card issuance request; and
      provide the virtual payment card to the mobile and wearable device; and
   a storage unit operable to store at least the user authentication information, the virtual payment card, the first merchant identification data, and the second merchant identification data, wherein the processor, the mobile and wearable device, the card issuance unit, and the storage unit are remotely located with each other and in operable connection over the data network;
   wherein the virtual payment card is associated with a joint operation with banks and top retailers;
   wherein the mobile and wearable device is associated with a cloud-based application running on the mobile and wearable device, wherein the cloud-based application resides in a cloud network is provided on the mobile and wearable device via one or more of the following: a web browser, a projector, and a hologram, an augmented reality (AR) device; a virtual reality (VR) device;
   wherein the cloud-based application is provided for purchasing in one or more applications stores, the one or more applications stores being associated with an operating system running on the mobile and wearable device, the operating system including one of the following: Microsoft Windows, Linux, Android, Blackberry, iOS, and Windows Phone;

wherein the cloud-based application is provided free of charge or at a predetermined price;

wherein the cloud-based application includes at least a bank account emulation (BAE) client, the BAE client is configured to provide emulation of a bank account to combine with cloud computing and provide an emulated virtual payment card, wherein the bank account is emulated based on metadata associated with the user, a phone number associated with the user, and data associated with a point-of-sale (POS) terminal of the merchant, wherein the BAE client is configured to provide a virtual representation of an emulated bank account;

wherein the operating system associated with the mobile and wearable device is configured to run the BAE client, provide two communication paths for NFC commands from the POS terminal based on an application identifier (AID) associated with the BAE client;

wherein the operating system is configured to use the AID to route the NFC commands to the cloud-based application managing the emulation of the bank account;

wherein when the user presents the emulated virtual payment card for transaction, an NFC command is routed to the BAE client for verification of the NFC commands by the cloud-based application managing the emulation of the bank account;

wherein the cloud-based application is configured to connect to a backend associated with the card issuer to complete the transaction;

wherein the cloud-based application is associated with a trusted tokenization node, the trusted tokenization node being a shared resource used to generate and de-tokenize tokens representing data associated with the virtual payment card at the backend associated with the issuer; and wherein the BAE client provides multi-level security by providing limited use keys, tokenization, device fingerprinting, and dynamic risk analysis, wherein the limited use keys are derived from a master domain key shared by the issuer, wherein a use of the limited use keys is associated with time to live of the limited use keys and a number of transactions to be performed using the limited use keys, wherein the device fingerprints are profiles associated with the mobile and wearable device and are used to determine that transactions are initiated only by an authorized mobile and wearable device at recognized locations of the POS terminal.

2. The system of claim 1, wherein the processor is further operable to: display the virtual payment card on the mobile and wearable device to be read by a card reader associated with the merchant.

3. The system of claim 2, wherein the virtual payment card is displayed in a form of a code, the code being selected from a group comprising: a linear dimensional code, a two-dimensional code, a snap tag code, and a Quick Response (QR) code.

4. The system of claim 1, wherein the processor is further operable to: set a validity period for the virtual payment card, the validity period being pre-selected by the user and stored in the user account, wherein the deactivating of the virtual payment card is performed upon expiration of the validity period.

5. The system of claim 1, wherein the processor is further operable to:

upon determining that the payment transaction associated with the user is completed, check whether a portion of the deposit amount is present on the virtual payment card;

transfer the portion of the payment amount from the virtual payment card to a payment card associated with the user, the payment card being determined based on the payment data, the payment card including one of a credit card and a debit card.

6. The system of claim 1, wherein the payment data includes data associated with one or more of the following: a credit card, a debit card, a retail card, a charge card, a bank saving account, a bank checking account, an insurance account, a stored-value card, and a digital mobile currency.

7. The system of claim 1, wherein the card issuer is selected from one or more of the following: a bank, a credit card company, an insurance company, a credit union, a store, and a third-party organization.

8. The system of claim 1, wherein the user authentication information includes one or more of the following: a name of the user, an address of the user, a guarantor name, a social security number of the user, a phone number of the user, an identification number of the user, a bank account of the user, an insurance account number of the user, and a photograph of the user.

9. A method for issuing single use virtual payment cards via a mobile and wearable device, the method comprising:

receiving over a data network, by a processor, from the mobile and wearable device of a user, a card issuance request for issuing a virtual payment card, wherein the card issuance request includes a payment amount and a first merchant identification data associated with a merchant;

in response to the card issuance request, prompting, by the processor, the user to enter a user authentication information;

receiving over the data network, by the processor, from the user, the user authentication information;

based on the user authentication information, accessing, by the processor, a user account maintained by a card issuer, wherein the user account includes at least a payment data associated with the user;

based on the payment data associated with the user and the first merchant identification data, generating, by a card issuance unit connected over the data network to and remotely located from the processor, merchant, and the mobile and wearable device, the virtual payment card, the virtual payment card having a deposit amount, the deposit amount being at least equal to the payment amount requested by the user in the card issuance request;

providing, by the card issuance unit, the virtual payment card to the mobile and wearable device;

receiving over the data network, by the processor, from the merchant, a transaction request to perform a payment transaction associated with the user, the transaction request including at least a second merchant identification data and data associated with the virtual payment card;

matching, by the processor, the first merchant identification data and the second merchant identification data;

upon determining a match of the first merchant identification data and the second merchant identification data, authorizing, by the processor, the payment transaction by transferring the payment amount from the to a merchant account associated with the merchant, the merchant account being retrieved from the second merchant identification data, wherein the processor is operable to transfer the payment amount in response to a merchant device reading an optical code encoding the virtual payment card data displayed on the mobile and wearable device of the user and to transmit virtual payment card data from the mobile and wearable device to a merchant device using a near field communication;

based on the transferring, determining, by the processor, that the payment transaction associated with the user is completed; and based on the determining that the payment transaction is completed, deactivating, by the processor, the virtual payment card; wherein the processor, the mobile and wearable device, the card issuance unit, and the storage unit are remotely located with each other and in operable connection over the data network;

wherein the virtual payment card is associated with a joint operation with banks and top retailers;

wherein the mobile and wearable device is associated with a cloud-based application running on the mobile and wearable device, wherein the cloud-based application resides in a cloud network is provided on the mobile and wearable device via one or more of the following: a web browser, a projector, and a hologram, an augmented reality (AR) device; a virtual reality (VR) device;

wherein the cloud-based application is provided for purchasing in one or more applications stores, the one or more applications stores being associated with an operating system running on the mobile and wearable device, the operating system including one of the following: Microsoft Windows, Linux, Android, Blackberry, iOS, and Windows Phone;

wherein the cloud-based application is provided free of charge or at a predetermined price;

wherein the cloud-based application includes at least a bank account emulation (BAE) client, the BAE client is configured to provide emulation of a bank account to combine with cloud computing and provide an emulated virtual payment card, wherein the bank account is emulated based on metadata associated with the user, a phone number associated with the user, and data associated with a point-of-sale (POS) terminal of the merchant, wherein the BAE client is configured to provide a virtual representation of an emulated bank account;

wherein the operating system associated with the mobile and wearable device is configured to run the BAE client, provide two communication paths for NFC commands from the POS terminal based on an application identifier (AID) associated with the BAE client;

wherein the operating system is configured to use the AID to route the NFC commands to the cloud-based application managing the emulation of the bank account;

wherein when the user presents the emulated virtual payment card for transaction, an NFC command is routed to the BAE client for verification of the NFC commands by the cloud-based application managing the emulation of the bank account;

wherein the cloud-based application is configured to connect to a backend associated with the card issuer to complete the transaction;

wherein the cloud-based application is associated with a trusted tokenization node, the trusted tokenization node being a shared resource used to generate and detokenize tokens representing data associated with the virtual payment card at the backend associated with the issuer; and wherein the BAE client provides multi-level security by providing limited use keys, tokenization, device fingerprinting, and dynamic risk analysis, wherein the limited use keys are derived from a master domain key shared by the issuer, wherein a use of the limited use keys is associated with time to live of the limited use keys and a number of transactions to be performed using the limited use keys, wherein the device fingerprints are profiles associated with the mobile and wearable device and are used to determine that transactions are initiated only by an authorized mobile and wearable device at recognized locations of the POS terminal.

10. The method of claim 9, further comprising displaying, by the processor, the virtual payment card on the mobile and wearable device to be read by a card reader associated with the merchant.

11. The method of claim 10, wherein the virtual payment card is displayed in a form of a code, the code being selected from a group comprising: a linear dimensional code, a two-dimensional code, a snap tag code, and a Quick Response (QR) code.

12. The method of claim 9, further comprising setting, by the card issuance unit, a validity period for the virtual payment card, the validity period being pre-selected by the user and stored in the user account, wherein the deactivating of the virtual payment card is performed upon expiration of the validity period.

13. The method of claim 9, further comprising:
upon determining that the payment transaction associated with the user is completed, checking, by the processor, whether a portion of the deposit amount is present on the virtual payment card;
transferring, by the processor, the portion of the payment amount from the virtual payment card to a payment card associated with the user, the payment card being determined based on the payment data, the payment card including one of a credit card and a debit card.

14. The method of claim 9, wherein the payment data includes data associated with one or more of the following: a credit card, a debit card, a retail card, a charge card, a bank saving account, a bank checking account, an insurance account, a stored-value card, and a digital mobile currency.

15. The method of claim 9, wherein the card issuer is selected from one or more of the following: a bank, a credit card company, an insurance company, a credit union, a store, and a third-party organization.

16. The method of claim 9, wherein the user authentication information includes one or more of the following: a name of the user, an address of the user, a guarantor name, a social security number of the user, a phone number of the user, an identification number of the user, a bank account of the user, an insurance account number of the user, and a photograph of the user.

17. A system for issuing single use virtual payment cards via a mobile and wearable device, the system comprising:
a processor configured to:
receive over a data network, from the mobile and wearable device of a user, a card issuance request for issuing a virtual payment card, wherein the card issuance request includes a payment amount and a first merchant identification data associated with a merchant;

in response to the card issuance request, prompt the user to enter a user authentication information;

receive over the data network, from the user, the user authentication information;

based on the user authentication information, accessing a user account maintained by a card issuer, wherein the user account includes at least a payment data associated with the user;

receive over the data network, from the merchant, a transaction request to perform a payment transaction associated with the user, the transaction request including at least a second merchant identification data and data associated with the virtual payment card;

match the first merchant identification data and the second merchant identification data;

upon determining a match of the first merchant identification data and the second merchant identification data, authorize the payment transaction by transferring the payment amount from the virtual payment card to a merchant account associated with the merchant, the merchant account being retrieved from the second merchant identification data, wherein the processor is operable to transfer the payment amount in response to a merchant device reading an optical code encoding the virtual payment card data displayed on the mobile and wearable device of the user and to transmit virtual payment card data from the mobile and wearable device to a merchant device using a near field communication;

based on the transferring, determine that the payment transaction associated with the user is completed;

upon determining that the payment transaction associated with the user is completed, check whether a portion of a deposit amount is present on the virtual payment card;

transfer the portion of the payment amount from the virtual payment card to a payment card associated with the user, the payment card being determined based on the payment data, the payment card including one of a credit card and a debit card; and based on the determining that the payment transaction is completed, deactivate the virtual payment card;

a card issuance unit connected over the data network to and remotely located from the processor, merchant, and the mobile and wearable device operable to:

based on the payment data associated with the user and the first merchant identification data, generate the virtual payment card, the virtual payment card having the deposit amount, the deposit amount being at least equal to the payment amount requested by the user in the card issuance request; and provide the virtual payment card to the mobile and wearable device; and a storage unit operable to store at least the user authentication information, the virtual payment card, the first merchant identification data, and the second merchant identification data, wherein the processor, the mobile and wearable device, the card issuance unit, and the storage unit are remotely located with each other and in operable connection over the data network;

wherein the virtual payment card is associated with a joint operation with banks and top retailers;

wherein the mobile and wearable device is associated with a cloud-based application running on the mobile and wearable device, wherein the cloud-based application resides in a cloud network is provided on the mobile and wearable device via one or more of the following: a web browser, a projector, and a hologram, an augmented reality (AR) device; a virtual reality (VR) device;

wherein the cloud-based application is provided for purchasing in one or more applications stores, the one or more applications stores being associated with an operating system running on the mobile and wearable device, the operating system including one of the following: Microsoft Windows, Linux, Android, Blackberry, iOS, and Windows Phone;

wherein the cloud-based application is provided free of charge or at a predetermined price;

wherein the cloud-based application includes at least a bank account emulation (BAE) client, the BAE client is configured to provide emulation of a bank account to combine with cloud computing and provide an emulated virtual payment card, wherein the bank account is emulated based on metadata associated with the user, a phone number associated with the user, and data associated with a point-of-sale (POS) terminal of the merchant, wherein the BAE client is configured to provide a virtual representation of an emulated bank account;

wherein the operating system associated with the mobile and wearable device is configured to run the BAE client, provide two communication paths for NFC commands from the POS terminal based on an application identifier (AID) associated with the BAE client;

wherein the operating system is configured to use the AID to route the NFC commands to the cloud-based application managing the emulation of the bank account;

wherein when the user presents the emulated virtual payment card for transaction, an NFC command is routed to the BAE client for verification of the NFC commands by the cloud-based application managing the emulation of the bank account;

wherein the cloud-based application is configured to connect to a backend associated with the card issuer to complete the transaction;

wherein the cloud-based application is associated with a trusted tokenization node, the trusted tokenization node being a shared resource used to generate and de-tokenize tokens representing data associated with the virtual payment card at the backend associated with the issuer; and wherein the BAE client provides multi-level security by providing limited use keys, tokenization, device fingerprinting, and dynamic risk analysis, wherein the limited use keys are derived from a master domain key shared by the issuer, wherein a use of the limited use keys is associated with time to live of the limited use keys and a number of transactions to be performed using the limited use keys, wherein the device fingerprints are profiles associated with the mobile and wearable device and are used to determine that transactions are initiated only by an authorized mobile and wearable device at recognized locations of the POS terminal.

* * * * *